United States Patent [19]

Bush et al.

[11] 4,186,259

[45] Jan. 29, 1980

[54] PROCESS FOR PRODUCING HOMOPOLYMERS OR COPOLYMERS OF VINYL OR VINYLIDENE HALIDES BY EMULSION POLYMERIZATION

[75] Inventors: Charles N. Bush, Bay Village; Bela K. Mikofalvy, Avon Lake, both of Ohio

[73] Assignee: The B. F. Goodrich Company, Akron, Ohio

[21] Appl. No.: 929,863

[22] Filed: Jul. 31, 1978

[51] Int. Cl.$^2$ ............................ C08F 2/24; C08F 4/34; C08F 14/06; C08F 14/08

[52] U.S. Cl. .................................. 526/74; 526/73; 526/173; 526/212; 526/213; 526/227; 526/343; 526/344.2; 526/345; 526/911; 525/4

[58] Field of Search ................... 526/4, 73, 173, 212, 526/213, 227, 345, 343, 488

[56] References Cited

U.S. PATENT DOCUMENTS

| | | | |
|---|---|---|---|
| 4,029,619 | 6/1977 | Tajima et al. | 526/74 |
| 4,071,675 | 1/1978 | Yu et al. | 526/344.2 |
| 4,076,920 | 2/1978 | Mikofalvy | 526/74 |

Primary Examiner—John Kight, III
Attorney, Agent, or Firm—Roy P. Wymbs

[57] ABSTRACT

The present invention relates to a process for preparing vinyl dispersion resins by conducting the polymerization reaction of the vinyl monomer or monomers in an aqueous alkaline medium, using an oil-soluble polymerization initiator, at temperatures preferably below about 48° C., in the presence of an emulsifier system comprising the ammonium salt of a high fatty acid containing from 8 to 20 carbon atoms, at least one long straight chain alcohol containing from 14 to 24 carbon atoms, and a sulfate or sulfonate type soap of $C_{12}$ to $C_{20}$ alkyl or aryl hydrocarbons, wherein the ratio of alcohol to emulsifier is equal to or greater than 1.0 and wherein the reaction ingredients are thoroughly mixed, and preferably homogenized, prior to polymerization. The process produces paste resins having improved plastisol foam properties, especially when sodium metabisulfite is added to the polymer recipe or the polymer slurry prior to spray drying. Further, polymer buildup in the reactor is substantially reduced and multiple polymerizations can be run in the reactor without opening the same.

15 Claims, No Drawings

PROCESS FOR PRODUCING HOMOPOLYMERS OR COPOLYMERS OF VINYL OR VINYLIDENE HALIDES BY EMULSION POLYMERIZATION

BACKGROUND OF THE INVENTION

It is well known that vinyl resins may be plasticized, or changed from the hard, horny and stiff state to a soft, plastic workable condition by the addition thereto at elevated temperatures of certain plasticizers, such as dioctyl phthalate, and the like. These vinyl polymers or resins are referred to as the dispersion resins or paste resins and are usually made employing an emulsion polymerization technique, although, in certain instances, a suspension polymerization process can be employed.

When the vinyl resin is mixed or blended with a plasticizer, it is referred to as a "plastisol". By virtue of the flowability of the plastisol it can be processed into various useful products. Plastisol can be used in making molded products, coatings, and the like. Accordingly, the dispersion resin must be capable of being mixed with a plasticizer easily and uniformly to form low viscosity plastisols which are stable, containing particles of uniform and proper size, and capable of producing films, and like products, of good clarity.

In U.S. Pat. No. 4,076,920, issued Feb. 28, 1978, there is described and claimed a process for producing dispersion or paste resins by emulsion polymerization having superior properties for producing plastisols for use in coatings and casting flexible films. These paste resins have improved flow properties and heat stability and the films produced therefrom have excellent clarity and improved water resistance. However, the plastisol foam properties of such resins are not the best and they do not meet the commercial standards of such products as coated fabrics, flooring underlay, foam flooring, and the like. Therefore, there is a need for a paste resin which will meet the criteria for these end uses.

Another detrimental problem in the commercial production of polymers and copolymers of vinyl and vinylidene halides, is the formation of undesirable polymer buildup on the inner surfaces of the reactor. This deposit or buildup of polymer on said reactor surfaces not only interferes with heat transfer, but also decreases productivity and adversely affects polymer quality. Obviously, this polymer buildup must be removed. If not, more buildup occurs rapidly on that already present resulting in a hard, insoluble crust. Accordingly, it is not only desirable to have an emulsion polymerization process in which the plastisol foam properties of the resins are improved, but also in which polymer buildup on the inner surfaces of the reactor is substantially reduced or completely removed.

SUMMARY OF THE INVENTION

We have unexpectedly found that when a proper combination of polymerization conditions and ingredients are employed, latices or paste resins can be produced which have the necessary and improved plastisol foam properties and with little or no polymer buildup in the reactor. The process comprises conducting the polymerization reaction of the vinyl monomer or monomers in an aqueous alkaline medium, using an oil-soluble free radical producing polymerization initiator, at temperatures below about 65° C., in the presence of an emulsifier system comprising (1) the ammonium salt of a high fatty acid containing from 8 to 20 carbon atoms, (2) at least one long straight chain alcohol containing from 14 to 24 carbon atoms, and (3) a sulfate or sulfonate type soap of $C_{12}$ to $C_{20}$ alkyl or aryl hydrocarbons, wherein the ratio of alcohol to emulsifier is equal to or greater than 1.0 and wherein the reaction ingredients are homogenized prior to polymerization. The process of this invention produces paste resins having improved plastisol foam properties, especially when sodium metabisulfite is added to the polymer slurry prior to spray drying. When using the process of the instant invention, polymer buildup in the reactor is substantially reduced, and multiple polymerizations can be run in the reactor without opening the same, thereby substantially reducing the amount of unreacted monomers in the surrounding atmosphere.

DETAILED DESCRIPTION

In the present invention, "vinyl dispersion resin" refers to polymers and copolymers of vinyl and vinylidene halides, such as vinyl chloride, vinylidene chloride, and the like. The vinyl halides and vinylidene halides may be copolymerized with one or more vinylidene monomers having at least one terminal $CH_2=C<$ grouping. As examples of such vinylidene monomers may be mentioned $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles such as acrylonitrile and methacrylonitrile; acrylamides, such as methyl acrylamide, N-methylol acrylamide, N-butoxy methacrylamide and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate, vinyl pyridine, methyl vinyl ketone, and other vinylidene monomers of the types known to those skilled in the art. The present invention is particularly applicable to the manufacture of vinyl dispersion resins or pastes made by the polymerization of vinyl chloride or vinylidene chloride alone or in admixture with one or more vinylidene monomers copolymerizable therewith in amounts as great as about 80% by weight, based on the weight of the monomer mixture. The most preferred vinyl dispersion resin is polyvinyl chloride and the invention, for simplicity and convenience, will be described in connection therewith, it being understood that this is merely intended in an illustrative sense and not limitative.

When preparing vinyl dispersion or paste resins the same is done by means of an emulsion polymerization technique in an aqueous medium. When employing such a technique it is necessary to have the proper emulsifier system and in the present invention this is preferably a combination of the ammonium salt of a long chain high fatty acid and a sulfate or sulfonate type soap. The saturated fatty acids useful in the present invention may be either natural or synthetic and should contain from 8 to 20 carbon atoms. As examples of such acids there may be named lauric, myristic, palmitic, marganic, stearic, and the like, beef tallow, coconut oil, and the like. The ammonium salt of the fatty acid is employed in the amount in the range of about 0.0% to about 1.0% by weight based on the weight of the monomer or monomers being polymerized. It is also possible to use mixtures of the ammonium salts of the fatty acids in the emulsifier system.

The ammonium salt can be made by mixing the fatty acid and the ammonium hydroxide, separating the salt and adding to the polymerization medium in the usual fashion. If desired, the ammonium salt can be dissolved in water, or other solvent, and then added to the polymerization medium in an amount to give the proper concentration of the ammonium salt in said medium. However, it is usually preferred, for reasons of expediency, to form the ammonium salt in situ, that is, the fatty acid and ammonium hydroxide are added separately to the polymerization mixture or medium wherein they react to form the salt. An excess of ammonium hydroxide over the equimolar amount with the fatty acid should be employed. This excess helps to maintain the reaction medium on the alkaline side which is important, as discussed hereinafter.

The important aspect of the present invention is the reduction of the ammonium salt of a high fatty acid level or concentration to 0 to 0.5 part and the addition of about 0.5 to about 1.25 parts of a sulfate or sulfonate type soap and about 0.03 to about 0.6 part of ammonia. This addition, or substitution, results in a polymerization recipe with the same high total solids, low reactor buildup, and excellent slurry colloidal stability as the high fatty acid, ammonia, long straight chain alcohol recipe, as shown in U.S. Pat. No. 4,076,920, referred to above. The sulfate or sulfonate type soaps useful in the present invention are those having the general formula:

wherein n is an integer from 7 to 17, X is selected from

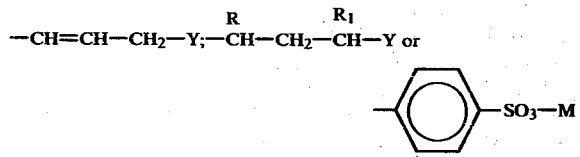

and wherein R is H, OH, or an alkyl group having from 1 to 4 carbon atoms; $R_1$ is H, or an alkyl group having from 1 to 4 carbon atoms; Y is —$SO_3$—M; —O—$SO_3M$; or —$OCH_2CH_2$—O—$_mSO_3$—M wherein M is selected from $NH_4$, Na, and K, and m is an integer from 7 to 17. As examples of the soaps having the above formula there may be named sodium lauryl sulfate, sodium lauryl ether sulfate, sodium dodecylbenzene sulfonate, sodium alkyl sulfonates, sodium hydroxy sulfonates, sodium alkenyl sulfonates, as well as the potassium salts, and the like.

In addition to the emulsifier system described above, a long straight chain saturated alcohol containing from 14 to 24 carbon atoms is employed in combination therewith. Examples of such alcohols are tetradecanol, pentadecanol, hexadecanol, heptadecanol, octadecanol, nonadecanol, eicosanol, heneicosanol, docosanol, tricosanol, and tetracosanol. Mixtures of the alcohols can be employed. For example, a 14 carbon alcohol and an 18 carbon alcohol. Also, lower carbon content alcohols can be employed when mixed with the longer chain alcohols. For example, a mixture of dodecanol and octadecanol. While a ratio of alcohol to the emulsifier system described above of 1.0 can be used, the best results are obtained when said ratio is greater than 1.0.

In the practice of the present invention, the polymerization reaction is conducted at a high pH. The process can be conducted at a pH in the range of about 7.0 to about 12.0. However, it is preferred to operate in a pH range of about 8.0 to about 10.5. If the pH is too low, for example, below 7.0, the polymer buildup in the reactor increases and the coagulum increases. The amount of ammonium hydroxide needed to properly adjust the pH will depend in part on the particular emulsifier system being used in the reaction mixture.

The process described herein is conducted in the presence of a compound capable of initiating the polymerization reaction. Free radical yielding initiators, normally used for polymerizing olefinically unsaturated monomers, are satisfactory for use in the present process. The useful initiators or catalysts include, for example, the various peroxygen compounds, such as lauryl peroxide, isopropyl peroxydicarbonate, benzoyl peroxide, t-butyl hydroperoxide, diisononanoyl peroxide, t-butyl peroxypivalate, cumene hydroperoxide, t-butyl diperphthalate pelargonyl peroxide, 1-hydroxycyclohexyl hydroperoxide, and the like; azo compounds, such as azodiisobutyronitrile, dimethylazodiisobutyrate, and the like. Also useful initiators are the water-soluble peroxygen compounds, such as hydrogen peroxide, persulfates, such as potassium persulfate, ammonium persulfate, and the like. The amount of initiator used will generally be in the range between about 0.01% to about 0.5% by weight, based on the weight of 100 parts of monomer or monomers being polymerized, and preferably between about 0.02% and about 0.1% by weight.

In the present invention the initiators are charged completely at the outset of the polymerization by adding it to the monomer premix with the other ingredients of the reaction mixture. This mixing is done prior to homogenization and introduction into the reactor. However, when adding the initiator to the monomer premix and then homogenizing, it is necessary that the temperature during the premixing and homogenization steps be kept below the minimum temperature of reactivity of the particular initiator or initiators being employed. For example, when making a premix of vinyl chloride, water, ammonium salt of the fatty acid, the alcohol, and the sulfate or sulfonate type soap, and then adding t-butyl peroxypivalate thereto, the temperature is maintained at 25° C. during the mixing step and then during the homogenization step. Upon introduction of the homogenized mixture into the polymerization reactor, the temperature is then raised to that at which the reaction is to take place.

The temperature of the polymerization reaction is important since the intrinsic viscosity (IV) is a direct function of the temperature of a reaction. That is, the higher the temperature the lower the IV. We have found that in order to obtain the desired and improved plastisol foam properties, polymerization temperatures in the range of about 40° C. to about 65° C. are satisfactory. It is preferred, however, to employ a temperature in the range of about 48° C. to about 56° C. It should be noted however, that as the temperature of a reaction is increased, the polymer buildup increases. However, the buildup is not of the hard, crusty type and can readily be removed by rinsing or hosing down with water and without opening the reactor when appropriate spray nozzles are installed in the reactor. On the other hand, even this buildup can be controlled to a certain extent by keeping the walls of the reactor cool during the polymerization reaction, especially during the early stage of the reaction. In other words, the initial stage of the reaction is carried out at a low temperature, for example, from 30° C. to 40° C., and thereafter the temperature of the reaction is raised to obtain the desired IV in the resultant dispersion resin. This is accomplished by normal means, such as employing a jacketed reactor with circulating cool water or other liquid in the jacket. Using such a method is possible to polymerize at higher temperatures to obtain desirable IV dispersion resins and at the same time have reduced polymer buildup. For example, when the polymerization reaction medium is at a temperature of about 50° C., water at a temperature of about 15° C. would be circulated through the jacket. Upon completion of the polymerization reaction, there is added to the polymer latex or slurry from about 0.0 part to about 0.5 part of sodium metabisulfite and thereafter the dispersion resin is isolated in powder form from the latex by means of spray drying. That is, a fine spray of the polymer latex is injected into a heated air chamber thereby removing the water and recovering the dried resin in powder form. In addition to the sodium metabisulfite mentioned above, the following materials may likewise be employed: sodium bisulfite, sodium thiosulfite, sodium sulfite, etc. Thereafter, the resins are used to make plastisols to determine their end use quality.

Instead of adding the sodium metabisulfite, and like materials mentioned above, to the polymer slurry prior to spray drying, they may be added to the polymer recipe with the same beneficial results in the finished dried polymer. When adding these materials to the polymer recipe, they are employed in a range of about 0.0% to about 0.5% by weight, based on the weight of the monomer or monomers. A range of 0.1% to 0.25% by weight is preferred.

Plastisols are made with the dispersion or paste resins of the present invention by uniformly blending or intimately mixing, by conventional means, with 100 parts by weight of the dispersion resin in powder form, from about 30 to about 100 parts by weight of one or more plasticizers. The useful plasticizers may be described as the alkyl and alkoxy alkyl ester of dicarboxylic acids or the esters of a polyhydric alcohol and monobasic acid. As examples of such materials, there may be named dibutyl phthalate, dioctyl phthalate, dibutyl sebacate, dinonyl phthalate, di(2-ethyl hexyl) phthalate, di(2-ethyl hexyl) adipate, dilauryl phthalate, dimethyl tetrachlorophthalate, butyl phthalyl butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

The plastisols made from the dispersion resins of the instant invention should have the desired yield and preferably with little or no dilantency. Yield is simply defined as resistance to flow and is normally determined numerically through viscosity measurements employing well known standard techniques. Normally such values are arrived at by calculation from viscosity measurements using a Brookfield Model RVF Viscometer according to ASTM method D-1824-61T. Yield is determined from viscosity measurements of the plastisols at varying r.p.m.'s (revolutions per minute) after initial preparation and at intervals of aging. The viscosity is measured in centapoises (cps.) at a temperature of 23° C. In the Examples which follow, viscosity measurements were made at 2 rpm and 20 rpm and are expressed as $V_2$ and $V_{20}$ respectively.

To further illustrate the present invention, the following specific examples are given, it being understood that this is merely intended in an illustrative and not a limitative sense. In the examples all parts and percents are by weight unless otherwise indicated.

EXAMPLE I

In this Example, a series of runs were made using the present process and to show the effect of adding $Na_2S_2O_5$ (sodium metabisulfite) to the polymerization recipe, which is set out in Table I below. In each of the runs a monomer premix tank or vessel was evacuated. Then the premix tank was charged with the water and then, under agitation, with the emulsifier and NH4OH followed by the alcohol and the catalyst, and lastly, the vinyl chloride. The temperature in the premix tank was controlled at about 25° C. by means of a cooling jacket. The mixture was agitated for about 15 minutes and thereafter was passed through a Manton Gaulin 2 stage homogenizer at a temperature of 25° C. into the polymerization reactor which had previously been evacuated. The pressure in the first stage of the homogenizer was 600 psig. and in the second stage was 700 psig. The contents of the reactor were heated to the polymerization temperature and held there throughout the reaction until the desired conversion was obtained. Thereafter the reactor was cooled, vented and emptied. The coagulum, scrapings and reactor conditions were recorded. The pertinent data is recorded in the following Table I.

TABLE I

| Run No. | Control | 1 | 2 | 3 | 4 |
|---|---|---|---|---|---|
| Recipe: | | | | | |
| Demineralized Water | 75 | 75 | 75 | 75 | 75 |
| Vinyl Chloride | 100 | 100 | 100 | 100 | 100 |
| Alcohol[1] | 2.1 | 2.1 | 2.1 | 2.1 | 2.1 |
| Emulsifier 104 (30%)[2] | 0.9 | 0.9 | 0.9 | 0.9 | 0.9 |
| NH4OH (28%) | — | 0.33 | 0.33 | 0.33 | 0.33 |
| LUPERSOL 11 (75%)[3] | — | 0.04 | 0.4 | 0.3 | 0.04 |
| SBP (20%)[4] | 0.011 | — | — | — | — |
| Lauroyl Peroxide | 0.037 | — | — | — | — |
| $Na_2S_2O_5$ | — | — | 0.1 | 0.25 | 0.2 |
| Polymerization Conditions | | | | | |

TABLE I-continued

| Run No. | Control | 1 | 2 | 3 | 4 |
|---|---|---|---|---|---|
| Reaction Temp. °C. | 51 | 51 | 51 | 51 | 51 |
| Reaction Time, hrs. | 14 | 11 | 9.75 | 11 | 11 |
| Coagulum, Dry % | | 0.1 | 0.1 | 0.01 | 0.05 |
| Grams | | 25 | 5 | 4 | 10 |
| % Conversion | Thick Charge | 88 | 87 | 90 | 91 |
| Reactor Buildup: | | | | | |
| Before Hosing-Walls | Semi solid like cottage cheese | 1/16-1/4" | 1/8" | 1/8" | 1/16" |
| Shaft | | 1/4" | 1/8" | 1/8" | 1/16" |
| Blades | | 1/4"-3/8" | 1/8-1/4" | 1/8-1/4" | 1/16" |
| Bottom | | 1/4" | 1/8-1/4" | 1/4" | 1/16" |
| After Hosing-Walls | | Med. Sand | Film To 1/8" | Clean To 1/8" | Sandy |
| Shaft | Scrapped | 1/16-1/8" | 1/16" | Clean To Fuzzy | Sandy |
| Blades | | 1/4" | 1/8-1/4" | 1/8-1/4" | Spots |
| Wt. of Buildup hosed down - grams | | 185 | 94 | 216 | 45 |
| % Buildup | | 0.4 | 0.2 | 0.45 | 0.09 |
| Results | | | | | |
| % Total Solids | Thick Charge | 51 | 50 | 52 | 52.5 |
| pH | | 10.1 | 10.5 | 10.2 | 9.9 |

[1] Mixture of $C_{12}$ and $C_{18}$ alcohols
[2] Sodium lauryl sulfate
[3] Tert-butyl peroxypivolate (Catalyst)
[4] di-secondary butyl peroxydicarbonate (catalyst)

As can be seen from the above, the addition of sodium metabisulfite to the recipe gave excellent results when added to the recipe in the present process. The coagulum was at a minimum and the buildup in the reactor was substantially reduced.

EXAMPLE II

In this example, a series of runs were made to show the effect of $NH_4OH$ level on buildup using the present process. The same procedure for conducting the reaction as used in Example I was followed. The pertinent data will be found in the following table:

TABLE II

| Run No. | Control | 5 | 6 | 7 | 8 |
|---|---|---|---|---|---|
| Recipe: | | | | | |
| D.M. Water | 75 | 75 | 75 | 75 | 75 |
| Vinyl Chloride | 100 | 100 | 100 | 100 | 100 |
| Alcohol[1] | 2.1 | 2.1 | 2.1 | 2.1 | 2.1 |
| Emulsifier 104 (30%)[2] | 0.9 | 0.9 | 0.9 | 0.9 | 0.9 |
| $NH_4OH$ (28%) | — | 0.66 | 0.33 | 0.165 | 0.08 |
| Lupersol 11 (75% in MS)[3] | — | 0.04 | 0.04 | 0.04 | 0.04 |
| SBP (20%)[4] | 0.011 | — | — | — | — |
| Lauroyl Peroxide | 0.037 | — | — | — | — |
| Sodium Metabisulfite | — | — | — | — | — |
| Polymerization Conditions: | | | | | |
| Reaction Temp., °C. | 51 | 51 | 51 | 51 | 51 |
| Reaction Time, hrs. | 14 | 12 | 11 | 13 | 11 |
| Coagulum, Dry % | Thick Charge | <0.1 | <0.1 | <0.1 | <0.1 |
| Grams | | 29 | 25 | 5 | 4 |
| % Conversion | | 86 | 88 | 88 | 89 |
| Reactor Buildup: | | | | | |
| Before Hosing-Walls | Semi Solid Like Cottage Cheese | 1/8" | 1/16-1/4" | 1/16" Spotty | 1/4" Spotty |
| Shaft | | 1/8-1/4" | 1/4" | 1/4" | 1/4" |
| Blades | | 1/4" | 1/4-3/8" | 3/8" Fuzzy | 3/8" Spotty |
| Bottom | | 1/8" | 1/4" | 1/16" | 1/4" Spotty |
| After Hosing-Walls | | 1/16-1/8" Spotty | Med. Sand | Lt. Sand | Lt. Sand to 1/16" |
| Shaft | | 1/8" | 1/16-1/8" | Lt. to Med. Sand | 1/16" |
| Blades | | 1/4" | 1/4" | Lt. Sand to 1/16" | 3/8-1/4" |
| Bottom | | Film | Lt. Sand | Lt. Sand | Lt. Sand to 1/16" |
| Wt. of Buildup Hosed down | | | | | |

TABLE II-continued

| Run No. | Control | 5 | 6 | 7 | 8 |
|---|---|---|---|---|---|
| (gms) | | 102 | 185 | 245 | 326 |
| % Buildup | | 0.2 | 0.4 | 0.5 | 0.65 |
| Results | | | | | |
| % Total Solids | Thick Charge | | | | |
| pH | 4.4 | 10.9 | 10.1 | 10.4 | 10.1 |

[1] Mixture of $C_{12}$ and $C_{18}$ alcohols
[2] Sodium lauryl sulfate
[3] Tert-butyl peroxypivolate (catalyst)
[4] di-secondary butyl peroxydicarbonate (catalyst)

The above data clearly show that the use of $NH_4OH$ and keeping the reaction on the alkaline side is necessary in order to reduce buildup.

EXAMPLE III

In this example, plastisols were made with resins produced in accordance with this invention in order to determine Brookfield RVF viscosities and also the cell structure rating and color rating. The plastisol recipe in all cases was as follows:

| | |
|---|---|
| PVC (polyvinyl chloride) | 100 parts |
| Dioctyl phthalate | 75 parts |
| Butyl benzyl phthalate | 25 parts |
| 50% dispersion of azo-bis-formamide in dioctyl phthalate | 6 parts |
| Zinc octoate | 3 parts |

The ingredients of the plastisol recipe were intimately mixed. The recipes used in making the PVC resins were as follows and the procedure of Example I was followed:

TABLE III

| | CONTROLS+ | | | | PVC OF INVENTION+ | |
|---|---|---|---|---|---|---|
| | 1 | 2 | 3 | 4 | 5 | 6 |
| Vinyl Chloride | 100 | 100 | 100 | 100 | 100 | 100 |
| Sodium Lauryl Sulfate | 0.9 | 0.9 | 0.9 | 0.9 | 0.9 | 0.9 |
| Alcohol $C_{12} + C_{18}$ | 2.1 | 2.1 | 2.1 | 2.1 | 2.1 | 2.1 |
| Di-Sec Butyl Peroxydicarbonate (20%) | 0.012 | — | — | — | — | — |
| Lauroyl Peroxide | 0.025 | — | — | — | — | — |
| Isopropyl Peroxy Percarbonate (20%) | — | — | 0.03 | 0.03 | — | — |
| Tert-Butyl Peroxypivolate (75%) | — | — | — | — | 0.04 | 0.04 |
| D. M. Water | 100 | 100 | 80 | 80 | 80 | 80 |
| $NH_4OH$ (28%) | — | — | — | — | 0.66 | 0.66 |
| Sodium Metabisulfite (added to slurry) | — | — | — | 0.25 | — | 0.25 |
| Brookfield RVF Viscosity cps. | | | | | | |
| Initial $V_2$ | 2300 | 2800 | 1750 | 2000 | 2200 | 2700 |
| $V_{20}$ | 2100 | 2400 | 1450 | 1400 | 2260 | 2450 |
| 1 Day $V_2$ | 3200 | 4600 | 3000 | 2800 | 6400 | 7200 |
| $V_{20}$ | 2500 | 3000 | 2450 | 2200 | 5100 | 5800 |
| Density | | | | | | |
| 4'/400° F. | 17.1 | 18.6 | 13.6 | 14.1 | 15.0 | 17.6 |
| 5'/400° F. | 15.9 | 20.4 | 13.3 | 13.4 | 13.9 | 16.8 |
| 7'/400° F. | 15.9 | Fail | 12.6 | 12.5 | 13.3 | 15.9 |
| Cell Structure Rating++ | | | | | | |
| 4'/400° F. | 1 | 1 | 4.0 | 4.0 | 1.5 | 0.5 |
| 5'/400° F. | 1.5 | 5+ | 4.0 | 4.0 | 2.5 | 1 |
| 7'/400° F. | 2.5 | Fail | 4.0 | 4.0 | 5 | 1.5 |
| Color Rating++ | 0 | 2.0 | 2.0 | 0.5 | 0 | |

+ All figures are in parts by weight.
++ Visual rating - 0 = Best; 5 = Worst

The new improved properites in the products of the instant invention can be seen from the above results. The above results clearly illustrate the advantage of the present invention. It should be noted that the post addition of the sodium metabisulfite improves the cell structure and color of the present resins but not of the control.

Among the many advantages of the present invention is the fact that the bloom and bleed resins of the invention is much reduced, and, more importantly, the resin plastisol foam properties are greatly improved. This enhances the use of thin plastisols in such end uses as thin flooring foam, in coated fabrics, automotive gasketing, and the like. Numerous other advantages will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process for producing polymers of vinyl and vinylidene halides and copolymers thereof with each other or either with one or more vinylidene monomers having at least one terminal $CH_2=C<$ grouping comprising forming a monomer premix containing the monomer or monomers to be polymerized, the aqueous reaction medium, from about 0.01% to about 0.5% by weight of a free-radical yielding catalyst based on the weight of 100 parts of monomer or monomers being polymerized, from about 0.0 to about 0.5 part of an ammonium salt of a saturated fatty acid containing from 8 to 20 carbon atoms, at least one long straight chain saturated alcohol containing from 14 to 24 carbon atoms, and from about 0.5 to about 1.25 parts of a sulfate or sulfonate type soap having the general formula

wherein n is an integer from 7 to 17, X is selected from the group consisting of

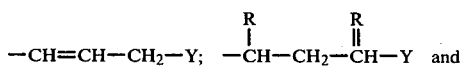

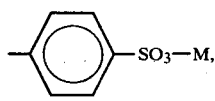

and wherein R is H, OH or an alkyl group containing from 1 to 4 carbon atoms; R is H, or an alkyl group containing from 1 to 4 carbon atoms; Y is $-SO_3-M$; $-O-SO_3-M$; or $-(OCH_2CH_2-O)_m SO_3-M$, wherein M is selected from $NH_4$, Na and K, and m is an integer from 7 to 17, the ratio of alcohol to emulsifier is equal to or greater than 1.0, homogenizing said premix at a temperature below the reactivity of the catalyst or catalysts employed, passing said homogenized premix to a reaction zone, initially polymerizing said homogenized premix in said zone at a temperature in the range of 30° C. to 40° C., then continuing the polymerization in said zone at a temperature in the range of about 40° C. to about 65° C. until complete, maintaining the pH in the reaction zone in the range of about 7.0 to about 12.0 throughout the polymerization reaction period, and thereafter recovering the polymer or copolymer latex or slurry and spray drying the same, whereby polymers and copolymers having improved plastisol foam properties are produced and polymer buildup in said reaction zone is substantially reduced.

2. A process as defined in claim 1 wherein the monomer in the premix is vinyl chloride.

3. A process as defined in claim 1 wherein from about 0.0 part to about 0.5 part of a sodium metabisulfite, sodium bisulfite, sodium sulfite or sodium thiosulfite is added to the monomer premix.

4. A process as defined in claim 1 wherein from about 0.0 part to about 0.5 part of sodium metabisulfite is added to reaction mixture leaving the reaction zone.

5. A process as defined in claim 1 wherein the ammonium salt of a saturated fatty acid is ammonium laurate.

6. A process as defined in claim 1 wherein the soap is sodium lauryl sulfate.

7. A process as defined in claim 1 wherein the catalyst is tert-butyl peroxypivalate.

8. A process as defined in claim 1 wherein the alcohol is a mixture of 2 alcohols containing 12 C's and 18 C's.

9. A process as defined in claim 8 wherein the monomer in the premix is vinyl chloride.

10. A process as defined in claim 9 wherein the catalyst is tert-butyl peroxypivalate.

11. A process as defined in claim 10 wherein the soap is sodium lauryl sulfate.

12. A process as defined in claim 11 wherein 0.25 part of sodium metabisulfite is added to the monomer premix.

13. A process as defined in claim 12 wherein the temperature in the homogenizing step is 25° C.

14. A process as defined in claim 1 wherein from about 0.0 part to about 0.5 part of a sodium metabisulfite, sodium bisulfite, sodium sulfite or sodium thiosulfite is added to the polymer or copolymer latex or slurry after recovery from the reaction zone and prior to spray drying.

15. A process as defined in claim 11 wherein 0.25 part of sodium metabisulfite is added to the reaction mixture leaving the reaction zone.

* * * * *